Feb. 3, 1970  H. G. BRADLEY  3,493,112
FILTER APPARATUS INCLUDING CONTAMINANT REMOVAL MEANS
Filed June 5, 1967  3 Sheets-Sheet 3
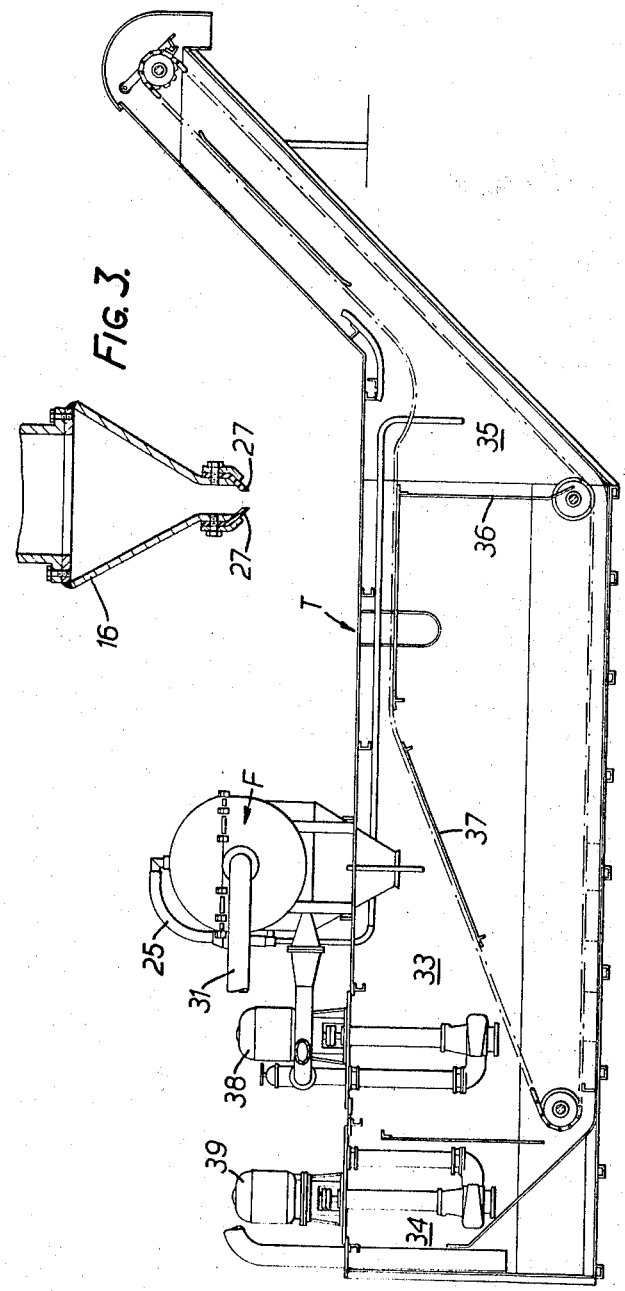
Henry G. Bradley
INVENTOR
BY
Lawrence E. Laubscher
ATTORNEY 3,493,112
FILTER APPARATUS INCLUDING CONTAMINANT REMOVAL MEANS
Henry G. Bradley, Ringwood, England, assignor, by mesne assignments, to Ronald F. Worlidge, Parkstone, Poole, Dorset, England
Filed June 5, 1967, Ser. No. 643,434
Claims priority, application Great Britain, June 7, 1966, 25,256/66
Int. Cl. B01d 33/06
U.S. Cl. 210—107                10 Claims

ABSTRACT OF THE DISCLOSURE

The invention comprises a filter apparatus having a screen of, for example fine steel mesh, woven plastic such as nylon or polypropylene or any other material suitable for use as a filtering media, means defining a path for the flow of liquid to the screen, and a nozzle whose open end is located adjacent the contaminate receiving surface of the screen, means being provided to cause relative movement between the screen and nozzle, and means to maintain the outlet of the nozzle at a lower pressure than that adjacent the screen so that in operation a flow will be induced into the nozzle the outlet of which is external to the filter and during a given period of time the whole of the contaminate receiving surface of the screen will by virtue of the relative movement move past the nozzle.

---

This invention is concerned with improvements in or relating to filter apparatus for filtering liquid with a solid contaminate.

In known methods of cleaning filters, it is common for the contaminate to be removed by a mechanical function which may take any one of a number of forms. It is an object of the invention to provide a different means for removing solid contaminate from the filter.

According to the invention there is provided a filter apparatus comprising a filter screen, means defining a flow path for liquid with a solid contaminate through the screen, a solid contaminate removal means adjacent the contaminate receiving surface of the screen, and means for causing relative movement between the screen and the solid contaminate removal means such that during a given period of time substantially the whole of the contaminate receiving surface of the screen will, by virtue of such relative movement, move past the solid contaminate removal means to enable such means to remove solid contaminate from the screen.

The solid contaminate removal means preferably comprises a nozzle having an opening of a length substantially equal to that of a transverse dimension of the screen.

The screen may be of any of a number of different materials, for example fine wire mesh, woven plastic such as nylon or polypropylene or any other material suitable for use as a filtering media.

The screen may also take a number of different forms, for example a flat rectangular sheet, a circular disc or the peripheral surface of a drum.

A preferred filter apparatus, embodying the invention, includes a drum located inside a casing, the screen being at the peripheral surface of the drum, an inlet to the casing for admitting solid contaminated liquid to between the casing and the drum, and an outlet from the interior of the drum for discharging filtered liquid therefrom, said flow path defining means constraining the unfiltered, admitted liquid to pass into the interior of the drum only through the screen whereat to be filtered, the nozzle being also located inside the casing adjacent the exterior surface of the screen, and the drive means being effective to rotate the drum relative to the nozzle so as to present the circumferential length of the screen to the nozzle during one complete revolution of the drum. The filter apparatus would be operated so that solid contaminate is removed from the screen by causing the outlet of the nozzle to be at a pressure lower than that in a region of the apparatus adjacent the screen, the effect being that there is induced a flow of liquid, with which is entrained solid contaminate from the screen, into the nozzle.

The preferred filter apparatus may be operated such that solid contaminant is conveyed out of the apparatus by a flow of liquid that is small compared with the main flow of liquid through the apparatus.

In certain instances, it may be necessary that the solid contaminant is finally removed in a dry or semi-dry state, and in such cases a secondary filter may be provided to separate the contaminate from the small or relatively small flow of iquid with which it was removed from the apparatus.

The flow into the nozzle may be induced by connecting to the nozzle outlet a suitable means of creating a suction such as a centrifugal pump or a venturi type ejector. Alternatively, a pressure above atmospheric may be set up at the contaminate receiving surface of the filter screen in which case no suction need be applied to the nozzle outlet which would be at atmospheric pressure.

Pressure may be generated within the filter apparatus by virtue of the filtering media itself, providing a resistance to flow from the contaminate receiving or dirty side to the clean side of the filter screen, such resistance increasing as the media becomes to some extent contaminated with the solid contaminate being removed.

Alternatively, where the above method would not cause sufficient pressure to be generated, the discharge for filtered liquid may be throttled, thus generating a pressure within the entire filter apparatus. The pressure will not necessarily be equal on either side of the screen, that on the dirty side being slightly higher, but this is of no consequence.

Where pressure generation provides the means whereby flow is induced into the nozzle, the filter screen and associated flow path defining means for the dirty and for clean liquid must be in the form of a pressure tight housing.

As contaminate collects on the screen, relative movement between the screen and the nozzle, brings the said contaminate into a position in line with the entry to the nozzle, the flow into the nozzle tending to entrain the contaminate and pass it into the nozzle. It will further be seen that the effectiveness of the entrainment will depend upon the distance between the nozzle entry and the screen. If the nozzle is positioned somewhat away from the screen, a certain thickness of contaminate will build up on the screen before the scouring action of the nozzle commences to remove the contaminate, thus preventing further build-up, and it will also be seen that by moving the nozzle closer to the screen the thickness of contaminate permitted may be reduced. In the event that the nozzle is brought in close proximity to the screen, substantially all contaminate will be removed and it will further be seen that a condition will eventually occur such that the resistance of flow of liquid into the nozzle from the dirty side of the screen will increase owing to the close proximity of the nozzle to the screen resulting in an easier flow path for liquid from the clean side of the screen into the nozzle thus achieving the function commonly known as back-flushing. Whereas in commonly known filter apparatus, back-flushing of the entire screen takes place simultaneously, the present filter apparatus provides a means of localizing the back-flushing, thus achieving two objectives. First a concentrated back-flushing over a small area which in itself would be more effective to clean the media, and second the back-flushing is effective whilst the whole of the media area not influenced by the nozzle at any one time is still performing its normal filtering function.

It will further be seen that the whole operation of the removal of contaminate concentrated in a relatively small volume of liquid is carried out without interruption and further without interrupting the normal filtering function or the normal full flow of liquid from the filter apparatus.

In order that the invention may be well understood the preferred embodiment thereof, given by way of example only, will now be described with reference to the accompanying drawings, in which:

FIGURE 3 is a section on the line III—III of FIGURE 2; and

FIGURE 4 is a view of a filtering system incorporating the same filter apparatus.

Figure 1:
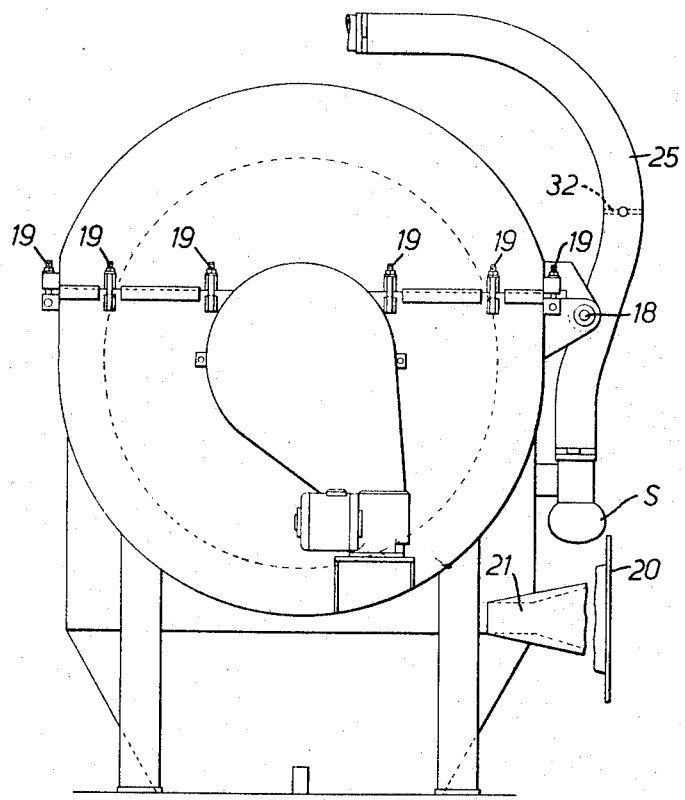
FIGURE 1 is an end view of the preferred filter apparatus embodying the invention.
Figure 2:
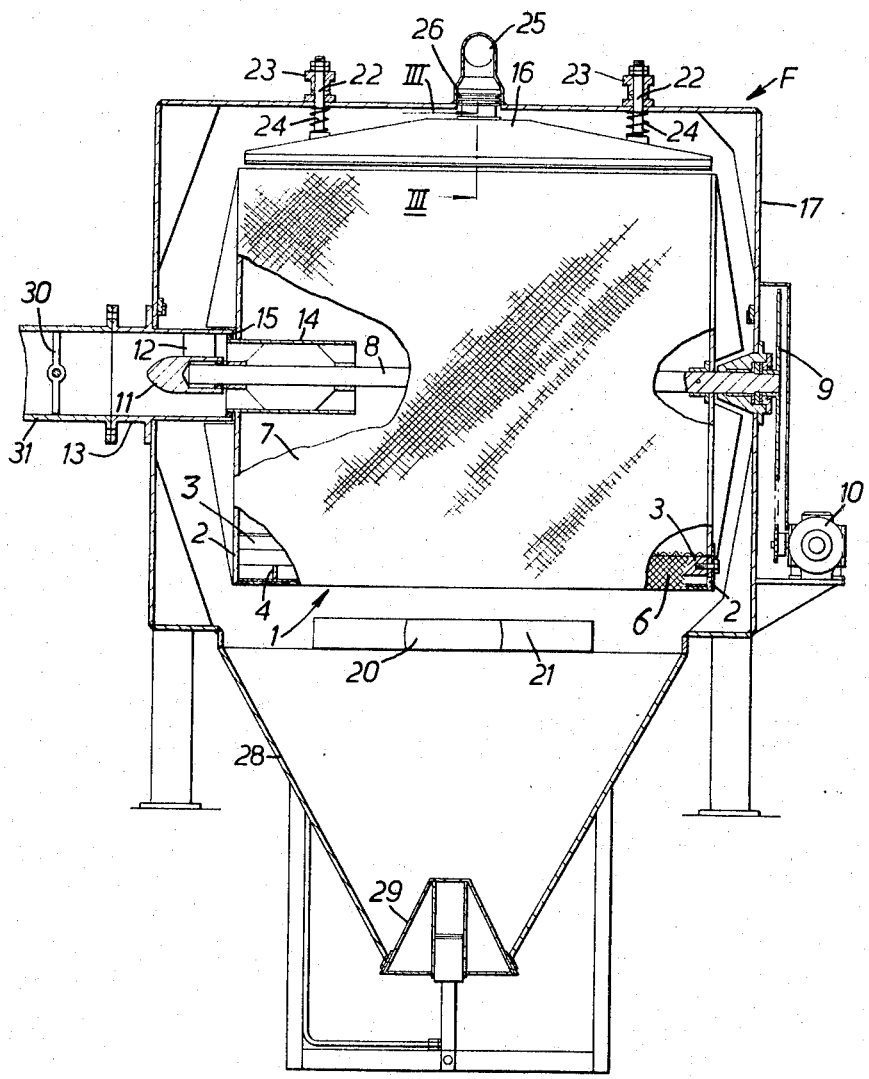
FIGURE 2 is an axial section of the same filter apparatus.

The filter apparatus F comprises a drum-like member 1 of rigid construction having closure members 2 at each end, the curved surface of the drum being of an open but rigid construction in this case formed by axial bars 3 and circumferential ties 4. This surface may be covered with a relatively coarse open material 6 such as woven wire mesh to give added support to the media 7 itself which is being wrapped tightly around the drum and sealed at its edges and termination point such that the only passage for liquid to pass to the space within the drum is by passage through the media.

The drum is mounted on a shaft 8 and constrained to revolve in two bearings one adjacent either end of the drum. The shaft may take the form of a tube to provide a convenient means for permitting the flow of filtered liquid from within the drum, but as shown is solid at one end on which is keyed a drive sprocket 9 driven by a motor 10, and is set in a bearing 11 carried by internal webs 12 of an outlet pipe 13 at the other end, that pipe communicating with an outlet conduit 14 coaxial with the shaft.

The conduit 14 revolves within the pipe 13, a liquid tight seal, which may take the form of a proprietary lip type rubber ring 15, preventing the passage of liquid from the dirty side of the filter apparatus into the clean liquid being discharged from the apparatus.

A nozzle 16 is mounted so that its length spans the width of the drum 1, the entrance to the nozzle being parallel to the centre line of the drum, and being positioned adjacent the surface of the drum. The drum and nozzle are enclosed within a pressure tight housing 17 hinged at 18 and closed by clamps 19. A dirty liquid inlet 20 is provided in the housing, liquid entering therein by a spreader 21.

The nozzle 16 is mounted on a plurality of guides 22 such that movement of the nozzle is constrained in a radial plane, fixing stops 23 limiting such movement.

The nozzle 16 is biased by springs 24 towards the drum, and means (not shown) are provided for moving the nozzle away from the drum 1. A nozzle discharge tube 25 passes from the nozzle through a suitable seal 26 in the housing 17 to a discharge point external thereto. A suction means S may be connected to the tube 25.

The means for causing the nozzle 16 to move away from the drum 1 comprises a linkage mechanism coupled to a prime mover of any suitable form such as an air cylinder, hydraulic cylinder, electric motor drive or electric solenoid, the means used being dependent upon the particular application in which the filter apparatus is being used.

Means may also be provided for automatically initiating the movement of the nozzle 16 towards the drum 1 either as a result of a rise in pressure within the dirty compartment of the filter apparatus or according to a time cycle or as a result of manual operation either remotely controlled or directly applied.

The section of the nozzle 16 may be as shown in FIGURE 3 or the nozzle opening may comprise a space between two adjustable members. In either event the lips 27 of the nozzle 16 may be of metal, plastic, synthetic rubber or other suitable material.

The lower part 28 of the pressure tight housing 17 is of conical form having relatively steep sides, so that any contaminate which fails to be deposited on the surface of the drum 1 for removal by the nozzle 16 will settle by gravity to the lower smaller end of the conical housing which is slightly truncated and fitted with a power operated closure valve member 29 such that by opening that member, settled contaminate together with a relatively small volume of liquid will be discharged from the filter apparatus. The closure member 29 would normally be operated on an automatic time cycle. Additionally, the closure member 29 acts as a pressure relief valve.

It is believed that operation of the filter apparatus is self-evident from the foregoing description. However, briefly, dirty liquid is pumped into the housing through the inlet 20 and spreader 21 and flows upwards in a circular path to the drum 1. The drum is rotated in the opposite sense to the flow of liquid, and the liquid passes through the filter media 7 on the outside surface of the drum, and leaves the drum through the outlet pipe 13. Solid contaminate will be deposited on the drum, fine particles being retained, and coarse particles falling or being washed off and deposited on the bottom of the housing from where they are periodically removed by operation of the closure member 29. Such fine particles are removed from the drum by scouring or back-flushing, as described, or a combination of both.

In an alternative construction of filter apparatus, the nozzle 16 is mounted adjacent the horizontal centre line of the drum 1, and a vent pipe (not shown) is connected to the top of the housing 17.

The following three methods of cleaning the filter media 7 have also been found to be possible:

(a) The drum 1 revolves continuously and by partially closing a discharge valve 30 (which may be a proprietary butterfly valve) fitted to a discharge pipe 31 connected to the pipe 13 it is possible to so arrange the pressures within the filter apparatus that the pressure in the housing 17 is the highest, the pressure in the nozzle 16 is the lowest and the pressure inside the drum 1 is between the two. Some of the flow, therefore, passes round the lips 27 of the nozzle into the nozzle and some of the flow passes back through the filter media 7 into the nozzle continuously. This method of cleaning is referred to as continuous back-flush.

(b) In this method of cleaning, the drum 1 revolves continuously, the discharge valve 30 is normally wide open and only the scouring action performs any cleaning during filtration. If the media 7 becomes plugged and the pressure in the housing 17 rises, the discharge valve 30 closes completely; the pressures in the housing and inside the drum 1 equalize and most of the flow into the nozzle 16 is then back through the media rather than round the lips 27 as this is the easiest path for the liquid. This method of cleaning is referred to as positive back-flushing.

(c) Where the contamination being removed is small in quantity and relatively porous, the drum 1 is not continuously revolved but is left stationary and contamination permitted to build-up on the drum. During this time the discharge valve 30 is wide open and a valve 32 (which may be a proprietary butterfly valve) in the nozzle discharge tube 25 is closed so that there is no flow into the nozzle. When cleaning of the media 7 becomes necessary, the discharge valve 30 is closed, the nozzle valve 32 is opened and the drum motor 10 is started and cleaning by positive back-flushing takes place normally for one revolution of the drum 1 after which the discharge valve is opened, the nozzle valve is closed and the drum driving motor is switched off.

In many liquid cleansing applications, settling of the contaminate to the bottom of a tank or container by means of gravity and removing it by means of a scraper conveyor passing along the bottom of the tank and usually up an inclined ramp at one end is an effective method of cleaning the liquid but in such cases it is found that the rate of settling is slow, and effective cleaning can only be achieved by providing an excessively large tank which not only may be difficult to physically accommodate but involves the provision of a very large volume of fluid.

In the present embodiment, within a bulk storage tank from which the filter apparatus F is fed and which is fitted with the drag conveyor there is provided a baffle extending from above liquid level down to a point near to the bottom of the tank. That baffle is near to the conveyor discharge end of the tank and the flow of heavily contaminated liquid from the filter nozzle 16 is directed into this baffled-off section of the tank by means of convenient piping. The advantage may be illustrated by the following typical figures. The main flow through a given filter may be, for example, 1,000 g.p.m. A tank having 6 minutes supply of liquid would therefore contain 6,000 gallons, but six minutes would preclude cleaning by settling alone. The nozzle opening would be the width of the drum 1 say 3 feet by .25″ where the size of the contaminate particles is relatively small. The circumference of the drum for a flow of 1,000 g.p.m. would be in the order of 10 feet. It will be seen, therefore, that the area of nozzle opening is $\frac{1}{480}$ of the area of the drum. Therefore, if the flow of liquid into the nozzle 16 induced by the pressure within the filter apparatus is twice that through the filter media 7, the flow through the nozzle will be approximately 4 g.p.m. It will, therefore, be seen that if the aforesaid baffled-off section of the tank adjacent to the discharge end of the drag conveyor has a capacity of 400 gallons, then the settling time will be 100 minutes compared with six minutes for the bulk fluid.

Thus, all the contaminate removed by the nozzle 16 will have sufficient time to settle and be removed by the drag conveyor together with the heavier solids which settled in the main part of the tank rapidly and were not therefore pumped to the filter.

Such a system would consist of a tank T (FIGURE 4) divided into three compartments, the dirty compartment 33, the clean compartment 34 and the baffled-off smaller settling compartment 35; such baffle is referenced 36. The drag conveyor 37 would pass through the dirty compartment and settling compartment, effectively removing the contaminate. A centrifugal pump or pumps 38 would pump liquid under pressure from the dirty compartment to the filter F, the clean liquid emanating from the filter being discharged by suitable piping 31 into the clean section of the tank. Further pumps 39 would be provided, as necessary, to pump liquid from the clean compartment for whatever purpose may be required.

The filter apparatus may, of course, be used in such a manner that the concentrated contaminate and liquid coming from the nozzle are again filtered by any suitable means capable of completely separating the liquid and solids but it will be seen that such a filter apparatus, although it must be capable of containing the required volume of solids is required to handle only 0.2% of the total flow of liquid.

I claim:
1. Filter apparatus for filtering a contaminated liquid to remove a solid contaminate therefrom, comprising
a sealed housing containing a chamber and including an inlet adapted for connection with a source of said contaminated liquid, said housing including also a filtered liquid outlet;
a filter drum mounted for rotation in said housing chamber;
drive means normally rotating said filter drum;
conduit means affording communication between the interior of said drum and said housing outlet;
first fluid pressure means for establishing between said housing inlet and said housing outlet a first pressure differential causing the contaminated liquid to flow from said inlet to said outlet via the flow path including, in succession, the space in said housing external of said drum, radially inwardly through said filter drum, and through said conduit means, whereby solid contaminate is deposited on the external surface of said filter drum, said first fluid pressure means including discharge valve means connected with said outlet, said discharge valve means normally having a partially closed condition and being operable alternately to fully closed and fully open conditions, respectively;
nozzle means arranged in said housing chamber externally of said drum and directly in said contaminated liquid flow path, said nozzle means having an outlet, and an inlet extending longitudinally of, adjacent and spaced from the outer periphery of said drum;
and second fluid pressure means operable when said discharge valve means is in the partially closed condition for establishing between said housing chamber and said nozzle means a given second pressure differential lower than said first pressure differential to withdraw simultaneously from said housing chamber via said nozzle means both a portion of the filtered liquid that is drawn by backflushing from within the drum, and a portion of the contaminated liquid contained in the chamber externally of the drum together with the solid contaminate displaced from said drum by said back-flushing liquid, said discharge valve means being operable to said fully closed condition to equalize the fluid pressure inside and outside the drum, whereby said nozzle means will withdraw from said housing that fluid which is back-flushed from within the drum together with the solid contaminate dislodged thereby.

2. Apparatus as defined in claim 1, and further wherein said second fluid pressure means includes normally open nozzle valve means, said nozzle valve means being operable to a fully closed condition for a given time period during which said discharge valve means is in the fully open condition and said drive means is de-activated to interrupt rotation of said filter drum, thereby permitting build-up of contaminate on the drum, said nozzle means being returnable to its fully open condition and said discharge valve means being operable to the fully closed condition, whereupon said drive means are reactivated to effect positive back-flushing of the contaminate from the filter drum.

3. Apparatus as defined in claim 1, wherein said nozzle means is arranged to remove the contaminate from the periphery of the filter drum by scouring, and further including means for varying the radial spacing of the nozzle means relative to the drum.

4. Apparatus as defined in claim 3, wherein said means for varying the distance of said nozzle means relative to said drum comprises spring means biasing said nozzle means toward the filter drum.

5. Apparatus as defined in claim 1, wherein said second fluid pressure means includes suction pressure means connected with the outlet of said nozzle means.

6. Apparatus as defined in claim 1, wherein said second fluid pressure means includes means for venting to atmosphere the outlet of said nozzle means.

7. Apparatus as defined in claim 1, and further wherein said housing includes a conical lower part for receiving solid contaminate settled by gravity, said lower part containing a discharge opening, and further including closure means operable from a closed position to an open position to discharge the contaminate from said lower part.

8. Apparatus as defined in claim 1, and further including a tank; baffle means dividing said tank into dirty, clean and settling compartments; drag conveyor means extending between said dirty and settling compartments; pump means for pumping contaminated liquid from the dirty compartment to the housing inlet; first conduit means for passing filtered liquid from the housing outlet to said clean compartment; and second conduit means connected with the nozzle means for passing into the settling compartment the solid contaminate and liquid withdrawn from the housing via said nozzle means.

9. Filter apparatus for filtering a contaminated liquid to remove a solid contaminate therefrom, comprising
- a housing containing a chamber and including an inlet adapted for connection wth a source of the contaminated liquid, said housing including also a filtered liquid outlet;
- a filter drum mounted for rotation in said housing chamber;
- drive means normally driving said drum continuously in a given direction of rotation;
- conduit means affording communication between the interior of said drum and said housing outlet;
- first fluid pressure means for establishing between said housing inlet and said housing outlet a first pressure differential causing the contaminated liquid to flow from said inlet to said outlet via the flow path including, in succession, the space in said housing externally of said drum, radially inwardly through said filter drum, and through said conduit means, whereby contaminate is deposited on the external surface of said filter drum, said housing inlet being so arranged relative to said drum that said contaminated liquid is circulated in said housing chamber externally of said drum in a direction opposite to the direction of drum rotation;
- nozzle means arranged in said housing chamber externally of said drum and directly within said contaminated liquid flow path, said nozzle means having an outlet, and an inlet arranged longitudinally of, adjacent and radially spaced from the outer periphery of said drum;
- and second fluid pressure means for establishing between said housing chamber and said nozzle means a given second pressure differential lower than said first pressure differential to withdraw simultaneously from said housing chamber via said nozzle means both a portion of the filtered liquid that is withdrawn by backing-flushing from within the drum, and a portion of the contaminated liquid in the chamber externally of the drum together with the solid contaminate dislodged from said drum by said back-flushing liquid.

10. Filter apparatus for filtering a contaminated liquid to remove a solid contaminate therefrom, comprising
- a housing containing a chamber and including an inlet adapted for connection with a source of the contaminated liquid, said housing including also a filtered liquid outlet;
- rotatably driven filter means including a filter drum mounted for rotation in said housing;
- conduit means affording communication between the interior of said drum and said housing outlet;
- first fluid pressure means for establishing between said housing inlet and said housing outlet a first pressure differential causing the contaminated liquid to flow from said inlet to said outlet via the flow path including, in succession, the space in said housing externally of said drum, radially inwardly through said filter drum, and through said conduit means, whereby contaminate is deposited on the external surface of said filter drum;
- nozzle means arranged in said housing chamber externally of said drum and directly within said contaminated liquid flow path, said nozzle means having an outlet, and an inlet arranged longitudinally of, adjacent and radially spaced from the outer periphery of said drum;
- second fluid pressure means for establishing between said housing chamber and said nozzle means a given second pressure differential lower than said first pressure differential to withdraw simultaneously from said housing chamber via said nozzle means both a portion of the filtered liquid that is withdrawn by back-flushing from within the drum, and a portion of the contaminated liquid in the chamber externally of the drum together with the solid contaminate dislodged from said drum by said back-flushing liquid; and
- means operable to close said housing outlet to equalize the pressure of fluid inside and outside the drum, whereby fluid from within the drum is back-flushed through the filter drum and is withdrawn, together with the contaminate dislodged thereby, via said nozzle means.

References Cited

UNITED STATES PATENTS

| | | | |
|---|---|---|---|
| 693,896 | 2/1902 | Parker | 210—391 |
| 2,366,903 | 1/1945 | Harms et al. | 210—108 |
| 2,653,521 | 9/1953 | Ahlfors | 210—391 X |
| 2,655,265 | 10/1953 | Little | 210—398 |
| 2,999,597 | 9/1961 | Harms | 210—108 X |
| 3,347,379 | 10/1967 | Miller | 210—391 X |

REUBEN FRIEDMAN, Primary Examiner

JOHN W. ADEE, Assistant Examiner

U.S. Cl. X.R.

210—108, 257, 261, 398